(12) United States Patent
Ogasawara et al.

(10) Patent No.: US 7,606,863 B2
(45) Date of Patent: Oct. 20, 2009

(54) E-MAIL SERVER (75) Inventors: Shino Ogasawara, Kawasaki (JP); Takashi Miyamoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1020 days.

(21) Appl. No.: 10/896,171

(22) Filed: Jul. 22, 2004

(65) Prior Publication Data

US 2005/0021648 A1    Jan. 27, 2005

(30) Foreign Application Priority Data

Jul. 24, 2003    (JP) ............................. 2003-278761

(51) Int. Cl.
G06F 15/16 (2006.01)
G06F 15/173 (2006.01)

(52) U.S. Cl. .................. 709/206; 709/223; 709/246

(58) Field of Classification Search ................ 709/206, 709/223, 246
See application file for complete search history.

(56) References Cited

U.S. PATENT DOCUMENTS

| | | | | | |
|---|---|---|---|---|---|
| 6,018,761 | A | * | 1/2000 | Uomini | 709/206 |
| 6,025,931 | A | * | 2/2000 | Bloomfield | 358/402 |
| 6,445,460 | B1 | * | 9/2002 | Pavley | 358/1.15 |
| 6,732,090 | B2 | * | 5/2004 | Shanahan et al. | 707/3 |
| 6,915,333 | B2 | * | 7/2005 | Delia et al. | 709/206 |
| 6,983,309 | B1 | * | 1/2006 | Yoshizawa | 709/206 |
| 7,028,075 | B2 | * | 4/2006 | Morris | 709/206 |
| 7,031,009 | B2 | * | 4/2006 | McCarthy, Jr. | 358/1.15 |
| 7,068,190 | B2 | * | 6/2006 | Satomi et al. | 341/22 |
| 7,425,987 | B2 | * | 9/2008 | Creamer et al. | 348/211.3 |
| 2001/0033390 | A1 | * | 10/2001 | Tonegawa | 358/1.15 |
| 2002/0059362 | A1 | * | 5/2002 | Maeda | 709/203 |
| 2002/0065844 | A1 | * | 5/2002 | Robinson et al. | 707/500 |
| 2003/0063770 | A1 | * | 4/2003 | Svendsen et al. | 382/100 |
| 2005/0015457 | A1 | | 1/2005 | Warasawa | |

FOREIGN PATENT DOCUMENTS

| | | |
|---|---|---|
| CA | 2 280 844 A1 | 7/2000 |
| JP | 11168498 A | 6/1999 |
| JP | 2000216946 A | 8/2000 |
| JP | 2002-271672 A | 9/2002 |
| JP | 2003092605 A | 3/2003 |
| JP | 2004348529 A | 12/2004 |

* cited by examiner

*Primary Examiner*—Kevin Bates
(74) *Attorney, Agent, or Firm*—Birch, Stewart, Kolasch & Birch, LLP (57) ABSTRACT

E-mail transmitted from a sender terminal together with an attached image file is received by a mail server. The latter inserts a tag in the header of the image file that has been attached to the e-mail. The tag includes the name and telephone number, etc., of the sender, which have been stored in a database that archives personal information. The image file in which the sender name, etc., has been inserted is attached to the e-mail in place of the image file that was attached to the received e-mail, and this e-mail is then transmitted to the terminal of a receiving party.

8 Claims, 5 Drawing Sheets

PERSONAL-INFORMATION MANAGEMENT DATABASE

| MANAGEMENT ITEM | EXPLANATION |
|---|---|
| MAIL ADDRESS | MAIL-ADDRESS INFORMATION OF EACH INDIVIDUAL |
| TELEPHONE NUMBER | TELEPHONE-NUMBER INFORMATION OF EACH INDIVIDUAL |
| NAME | NAME OF EACH INDIVIDUAL |

//
E-MAIL SERVER

This Nonprovisional application claims priority under 35 U.S.C. § 119(a) on Patent Application No(s). 2003-278761 filed in Japan on Jul. 24, 2003, the entire contents of which are hereby incorporated by reference.

BACKGROUND OF THE INVENTION

1. Field of the Invention

This invention relates to an e-mail server for relaying e-mail transmitted from a transmission-source device and received at a transmission-destination device.

2. Description of the Related Art

In a proposed electronic device (see Japanese Patent Application Laid-Open No. 2002-271672, FIG. 10), management (retrieval, classification, etc.) of image files is facilitated by creating the image files in such a manner that identification information (date and time of photography, patient ID, camera ID, etc.) acquired from another electronic device (an electronic camera, ID card, etc.) is recorded in the files together with image data.

It has become possible in recent years to view an image that is based upon an attached image file at a transmission-destination terminal (a terminal possessed by the receiving party) by transmitting the image file upon attaching it to e-mail. When it is attempted to transmit information that facilitates image file management (retrieval, classification, etc.), as set forth in the above-cited patent reference, upon recording the information in an image file transmitted as an attachment to e-mail, it is required that the transmission-source terminal record such information in the image file in advance. However, recording information in an image file involves expenditure of time and labor at the transmission-source terminal.

DISCLOSURE OF THE INVENTION

Accordingly, an object of the present invention is to arrange it so that image files can be retrieved and classified at a transmission-destination terminal, which receives e-mail to which image files have been attached, without recording information in the image files at a transmission-source terminal that transmits e-mail with attached image files.

Another object of the present invention is to arrange it so that a transmission-destination terminal can ascertain the nature of image processing that has been applied to an image file transmitted upon attaching it to e-mail.

According to a first aspect of the present invention, the foregoing objects are attained by providing an e-mail server comprising: an e-mail receiving unit for receiving e-mail, to which an image file has been attached, transmitted from an e-mail transmission-source device; a sender-information archiving database for storing information relating to a sender who transmits the e-mail using the transmission-source device; an image processing unit for appending information relating to the sender that has been stored in the sender-information archiving database to the image file that has been attached to the e-mail received by the e-mail receiving unit; e-mail reconstructing means for attaching the image file, to which the information relating to the sender has been appended by the image processing unit, to the e-mail in place of the image file that was attached to the e-mail received by the e-mail receiving unit; and an e-mail transmitting unit for transmitting the e-mail, which has been obtained by the e-mail reconstructing means and to which the image file having the appended information relating to the sender has been attached, to the e-mail transmission-source device.

The present invention also provides a program for controlling the above-described e-mail server. Specifically, there is provided a program for causing an e-mail server, which relays e-mail transmitted from a transmission-source device and received at a transmission-destination device, to function as the following: an e-mail receiving unit for receiving e-mail, to which an image file has been attached, transmitted from an e-mail transmission-source device; a sender-information archiving database for storing information relating to a sender who transmits the e-mail using the transmission-source device; an image processing unit for appending information relating to the sender that has been stored in the sender-information archiving database to the image file that has been attached to the e-mail received by the e-mail receiving unit; e-mail reconstructing means for attaching the image file, to which the information relating to the sender has been appended by the image processing unit, to the e-mail in place of the image file that was attached to the e-mail received by the e-mail receiving unit; and an e-mail transmitting unit for transmitting the e-mail, which has been obtained by the e-mail reconstructing means and to which the image file having the appended information relating to the sender has been attached, to the e-mail transmission-source device.

E-mail to which an image file has been attached is transmitted from a device that is the source of the e-mail transmission. The image processing unit of the e-mail server appends the sender-related information that has been stored in the sender-information archiving database to the image file that has been attached to the e-mail received by the e-mail receiving unit. The image file to which the information relating to the sender has been appended is attached to the above-mentioned e-mail in place of the image file that was attached to the e-mail received by the e-mail receiving unit. The e-mail having the attached image file to which the information relating to the sender has been appended is transmitted to the device that is the transmission destination of the e-mail.

There are a variety of ways to append sender-related information stored in the sender-information archiving database to an image file that has been attached to received e-mail.

One way is to insert (add on) information relating to the sender into the header of the image file.

Another way is to employ an electronic watermark technique to embed information relating to the sender in image data contained in the image file.

In accordance with the present invention, the e-mail server appends sender-related information to an image file in e-mail to which the image file has been attached, this e-mail being transmitted from the e-mail transmission-source terminal to the transmission-destination terminal. As a result, the transmission-destination terminal (the terminal of the receiving party) is capable of retrieving and classifying image files by utilizing the sender information (e.g., the name of the sender) that has been appended to the image file. Since the information relating to the sender is appended to the image file at the e-mail server, it is unnecessary for the sender to append the information relating to the sender to the image file in advance by utilizing the transmission-source terminal. Hence, the sender is not subjected to any burden.

In a case where e-mail having an attached image file to which sender-related information has been appended is again transmitted from a transmission-source terminal toward a transmission-destination terminal (the transmission-source terminal and transmission-destination terminal at this time may be the same as or different from those that sent and received e-mail having an attached image file the previous time), new sender-related information is appended to the image file. It may be so arranged that the information relating to the sender the previous time remains in the image file (is caused to remain appended to the image file). In this case, the origin of the image file is left in the image file and therefore it is possible to determine whose image file it is.

The present invention can expressed in general terms as follows: Specifically, an e-mail server according to the present invention comprises: an e-mail receiving unit for receiving e-mail, to which an image file has been attached, transmitted from an e-mail transmission-source device; an information archiving database for storing one or a plurality of items of information in correspondence with a transmission-source e-mail address contained in the e-mail transmitted from the transmission-source device; an image processing unit for appending at least any one item of information to the image file that has been attached to the e-mail received by the e-mail receiving unit, the information being from among the information that has been stored in the information archiving database in correspondence with the transmission-source e-mail address contained in the e-mail received by the e-mail receiving unit; e-mail reconstructing means for attaching the image file, to which the information has been appended by the image processing unit, to the e-mail in place of the image file that was attached to the e-mail received by the e-mail receiving unit; and an e-mail transmitting unit for transmitting the e-mail, which has been obtained by the e-mail reconstructing means and to which the image file having the appended information has been attached, to the e-mail transmission-source device.

If it is so arranged that the image processing unit of the e-mail server appends sender information to an image file, then the image file can be retrieved, etc., at the transmission-destination device based upon the sender information in the manner described above. Of course, the information appended to an image file by the image processing unit of the e-mail server is not limited to sender information. The information may be the date (date and time) the e-mail receiving unit of the e-mail server received e-mail having an attached image file transmitted from the transmission-source device, or it may be information representing the model of the transmission-destination device, or other information. The type of information appended to an image file is set based upon a setting made at the image processing unit of the e-mail server, and the information of the type set is appended to the image file.

In one embodiment, the image processing unit further appends information, which represents the number of times the image file that has been attached to e-mail received by the e-mail receiving unit has passed through the e-mail server, to the image file. The fact that the same image file has been sent and received multiple times can thus be ascertained is useful in preventing transfer of the image file multiple times.

It is of course permissible to adopt an arrangement in which a flag, which indicates that the image file that has been attached to e-mail received by the e-mail receiving unit has passed through the e-mail server, is appended to the image file. The fact that transfer from a second time onward can be ascertained is useful in preventing transfer of the image file from the second time onward.

According to a second aspect of the present invention, the foregoing objects are attained by providing an e-mail server comprising: an e-mail receiving unit for receiving e-mail, to which an image file has been attached, transmitted from an e-mail transmission-source device; an image processing unit for applying prescribed image processing to image data contained in the image file that has been attached to the e-mail received by the e-mail receiving unit; e-mail reconstructing means for attaching a processed image file, which includes information relating to the image processing that has been applied by the image processing unit and the image data to which this image processing has been applied, to the e-mail in place of the image file that was attached to the e-mail received by the e-mail receiving unit; and an e-mail transmitting unit for transmitting the e-mail, which has been obtained by the e-mail reconstructing means and to which the processed image file has been attached, to the e-mail transmission-source device.

A program for controlling an e-mail server according to the second aspect of the present invention is for causing an e-mail server, which relays e-mail transmitted from a transmission-source device and received at a transmission-destination device, to function as the following: an e-mail receiving unit for receiving e-mail, to which an image file has been attached, transmitted from an e-mail transmission-source device; an image processing unit for applying prescribed image processing to image data contained in the image file that has been attached to the e-mail received by the e-mail receiving unit; e-mail reconstructing means for attaching a processed image file, which includes information relating to the image processing that has been applied by the image processing unit and the image data to which this image processing has been applied, to the e-mail in place of the image file that was attached to the e-mail received by the e-mail receiving unit; and an e-mail transmitting unit for transmitting the e-mail, which has been obtained by the e-mail reconstructing means and to which the processed image file has been attached, to the e-mail transmission-source device.

Image data contained in an image file that has been attached to e-mail transmitted from a transmission-source device and received by a transmission-destination device is subjected to prescribed image processing at the e-mail server, e.g., processing such as a grayscale correction, tone correction, compression or expansion, white balance correction and image rotation, etc. An image file that contains the image data that has undergone this image processing and information relating to the nature of image processing is attached to e-mail and then transmitted to the transmission-destination device. The e-mail server is capable of notifying the transmission-destination device of the kind of image processing that was applied to image data in the image file received by the transmission-destination device. This is convenient in a case where it is desired to restore the original image data (the image data in the form it possessed when it was transmitted from the transmission-source device).

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1:
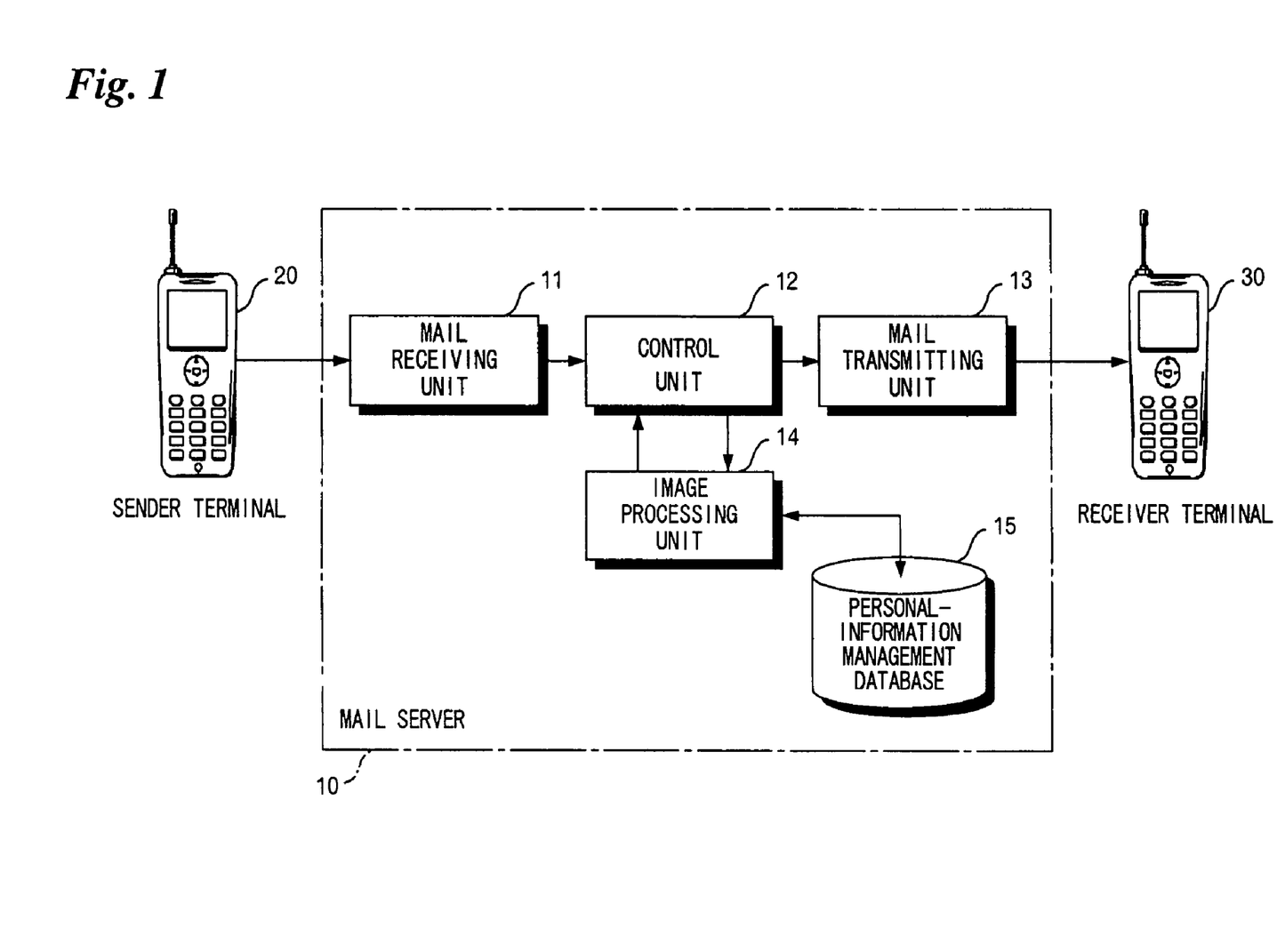
FIG. 1 is a block diagram illustrating the overall configuration of an e-mail system.

FIG. 1 is a block diagram illustrating the general features of an e-mail system.

As shown in FIG. 1, the e-mail system includes a sender terminal 20 utilized to transmit e-mail, a receiver terminal 30 utilized to receive e-mail, and a mail server 10 for relaying e-mail transmitted from the sender terminal 20 and received by the receiver terminal 30. The sender terminal 20, mail server 10 and receiver terminal 30 are interconnected by the Internet so as to be capable of communicating with one another.

The sender terminal 20 is a terminal device that is capable of transmitting e-mail to which an image file has been attached (such e-mail shall be referred to as "mail with an image" below) to the receiver terminal 30. The receiver terminal 30 may be a terminal device that is or is not capable of receiving mail with an image. If the receiver terminal 30 is a terminal that is incapable of receiving mail with an image, then, when mail with an image is transmitted toward the receiver terminal 30, the mail server 10 archives the image file that has been attached to this mail and transmits e-mail that includes the address of the archival location (an URL for viewing the image) to the receiver terminal 30. On the basis of the address of the archival location (the URL for viewing the image), the receiver terminal 30 can receive and view the image file that was attached to the mail transmitted to the receiver terminal 30. In the description that follows, it will be assumed that mail with an image is capable of being received.

Mail with an image that has been transmitted from the sender terminal 20 toward the receiver terminal 30 is relayed in the mail server 10. The latter includes a mail receiving unit 11 for receiving mail with an image transmitted from the sender terminal 20; a control unit 12 for applying the mail with the image, which has been received by the mail receiving unit 11, to an image processing unit 14, and applies the mail with the image, which has undergone prescribed processing in the image processing unit 14, to a mail transmitting unit 13; the mail transmitting unit 13 for transmitting the mail with the image, which has undergone prescribed processing in the image processing unit 14, to the receiver terminal 30; and the image processing unit 14 for subjecting the image file to the prescribed processing. The details of the prescribed processing executed by the image processing unit 14 will be described later.

Figure 2:
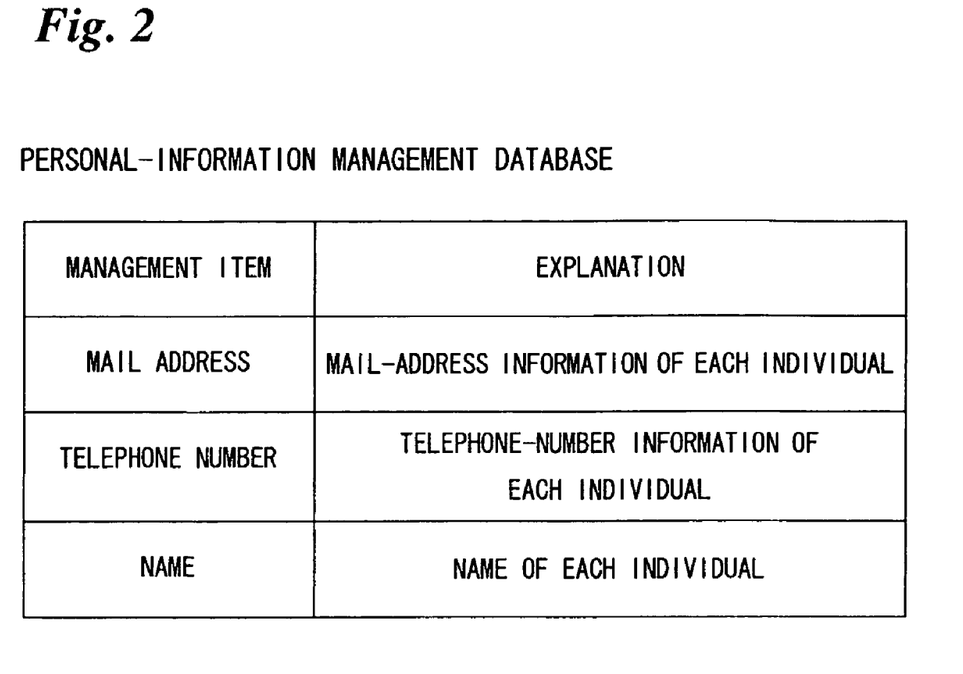
FIG. 2 illustrates management items and details thereof in an personal-information management database.

A personal-information management database 15 is connected to the image processing unit 14. FIG. 2 illustrates items (management items) of data being managed in the personal-information management database 15 as well as the nature of these items.

Information (personal information) regarding each user who is capable of sending and receiving e-mail utilizing the mail server 10 has been stored in the personal-information management database 15. In this embodiment, the mail address information, telephone number and name of a user who is capable of sending and receiving e-mail utilizing the mail server 10 has been stored as personal information in the personal-information management database 15 on a per-user basis.

Figure 3:
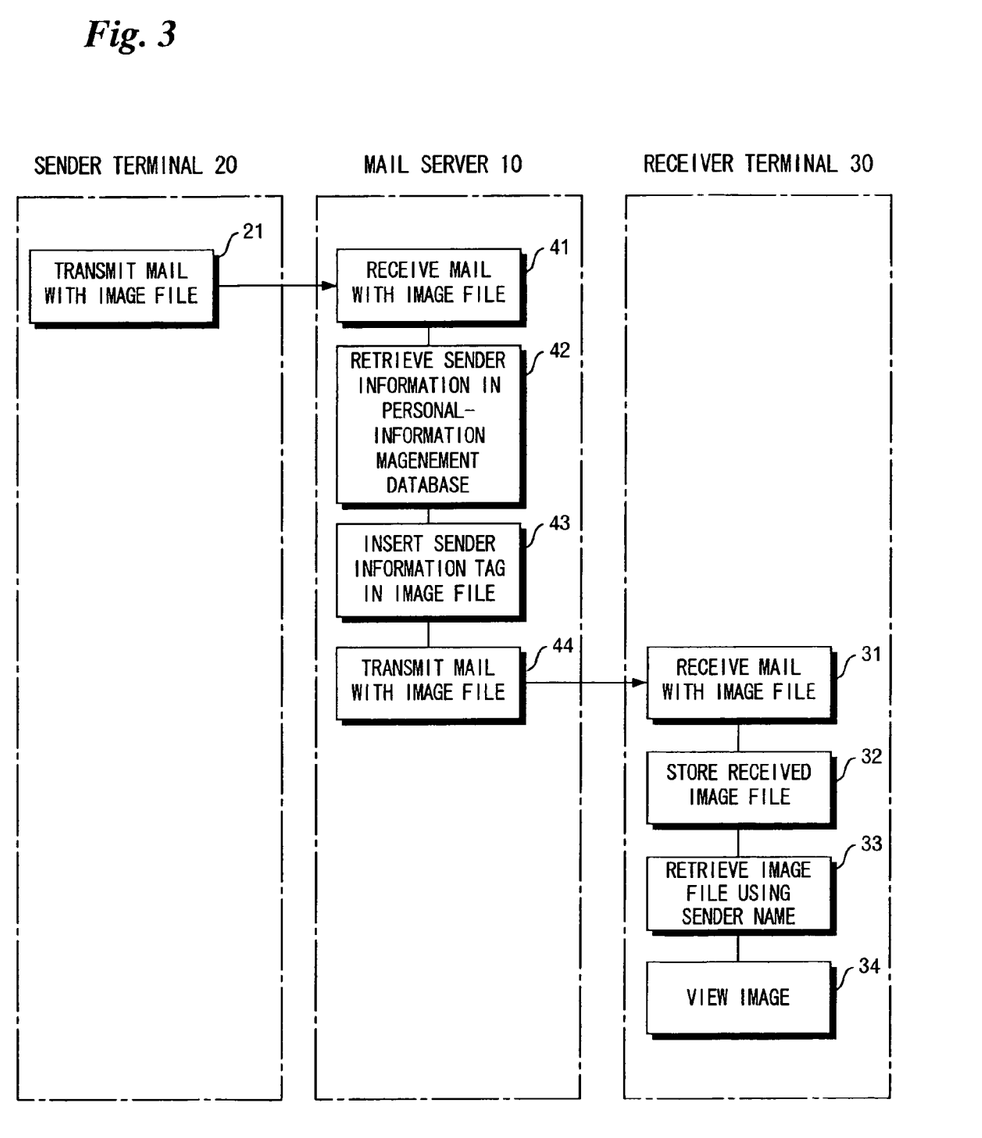
FIG. 3 is a flowchart illustrating an example of processing executed by a sender terminal, a mail server and a receiver terminal.

FIG. 3 is a flowchart illustrating an example of processing executed by the sender terminal 20, mail server 10 and receiver terminal 30 that construct the e-mail system.

When mail with an image is transmitted from the sender terminal 20 toward the receiver terminal 30 (step 21), the mail with the image is received by the mail receiving unit 11 of the mail server 10 (step 41). The mail with the image includes the mail address of the receiver terminal 30 [the transmission-destination (receiving party) mail address], the mail address of the sender terminal 20 [the transmission-source (sender) mail address] and the image file, etc.

The mail with the image received by the mail receiving unit 11 of the mail server 10 is applied to the control unit 12. The latter applies the image file contained in the mail with the image and the mail address of the sender terminal 20 (the mail address of the sender) contained in the mail with the image to the image processing unit 14.

Figure 4:
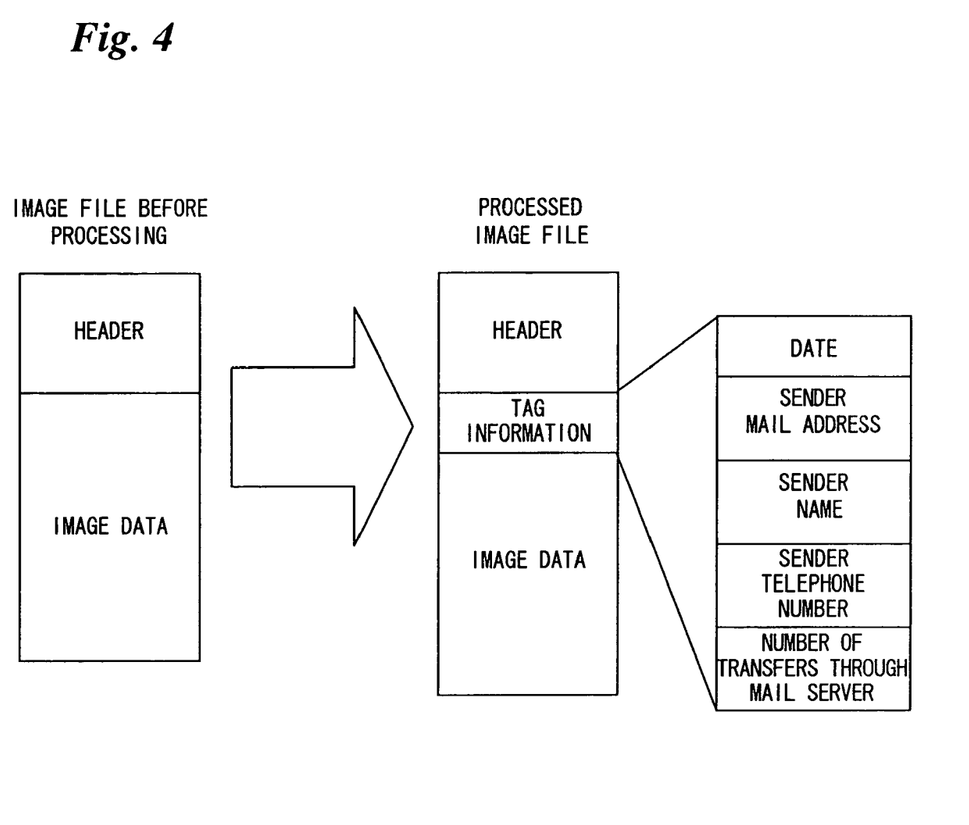
FIG. 4 illustrates an example of the data structure of an image file before processing and the data structure of the image file after processing.

The image processing unit 14 accesses the personal-information management database 15 and reads out the name (identity) and telephone number of the sender of the mail with the image stored in the personal-information management database 15 in correspondence with the sender mail address supplied from the control unit 12 (step 42). The image processing unit 14 executes processing for inserting a tag (referred to as a "personal information tag") in the header of the image file (step 43). The personal information tag includes the date (which is based upon the machine time of the mail server 10) the mail with the image was received by the mail server 10 (the mail receiving unit 11), the sender mail address supplied from the control unit 12, the sender name (identity) and sender telephone number read out of the personal-information management database 15, and the number of times this image file has passed through the mail server 10. FIG. 4 illustrates an example of the data structure of an image file before the above-mentioned tag insertion processing (this file shall be referred to as an "image file before processing") and the data structure of the image file after the insertion processing (this file shall be referred to as a "processed image file").

It goes without saying that in a case where the number of times an image file has passed through the mail server 10 has already been inserted in the header of the image file applied to the image processing unit 14, the image processing unit 14 increments the number of times.

An image file in which the personal information tag has been inserted by the image processing unit 14 is supplied from the image processing unit 14 to the control unit 12. The latter attaches the image file in which the personal information tag has been inserted (namely the processed image file) in place of the image file that was attached to the mail with the image transmitted from the sender terminal 20 (namely the image file before processing). The mail transmitting unit 13 transmits the e-mail having the attached processed image file (this mail shall be referred to as "mail with a processed image") to the receiver terminal 30 (step 44).

The receiver terminal 30 receives the mail with the processed image transmitted from the mail server 10 (step 31). If necessary, the receiver terminal 30 stores the processed image file, which has been attached to the received mail with the processed image, in the memory of the receiver terminal 30 (step 32).

As mentioned above, a processed image file includes the tag information that contains the date, the mail address of the sender, the name of the sender and the telephone number of the sender. As a result, retrieval of the image file that has been stored in the memory of the receiver terminal 30 can be conducted using any item (or plurality of items) of this information. For example, by using the name of the sender (the identity of the sender), only image files that have been transmitted from a specific individual can be extracted from image files that have been stored in the memory of the receiver terminal 30 (step 33). The images based upon the extracted image files that have been transmitted from the specific individual can be displayed on the display screen of the receiver terminal 30 (step 34).

Since the tag indicating the number of times the image file passed through the mail server 10 has been inserted into the header of the processed image file attached to the mail with the processed image transmitted and received through the mail server 10, how many times the image file has been sent and received via the mail server 10 can be ascertained. Transfer of an image file a number of times greater than a certain limit can be preventing by using the tag information indicating number of times the image file passed through the mail server 10. In a case where the tag inserted into the header of an image file received by the mail server 10 indicates that the number of times the image file passed through the mail server 10 is greater than the limit, it will suffice if the mail server 10 (control unit 12) is operated in such a manner that this image file will not be transmitted to the receiver terminal 30.

It is of course possible to so arrange it that transmission of an image file is prevented from the second time onward. In such case it may be so arranged that a flag indicating a single passage through the mail server 10 is inserted into the header of the image file by the tag rather than the number of passages through the mail server 10. When e-mail with a processed image having an attached processed image file possessing the flag indicating passage through the mail server 10 is received by the mail server 10, the mail server 10 (control unit 12) can be made to operate so as not to transmit this processed image file to the receiver terminal 30.

Information inserted into the header of the image file at the image processing unit 14 of the mail server 10 is not limited to information concerning a user who transmitted mail with an image; other information is permissible.

Figure 5:
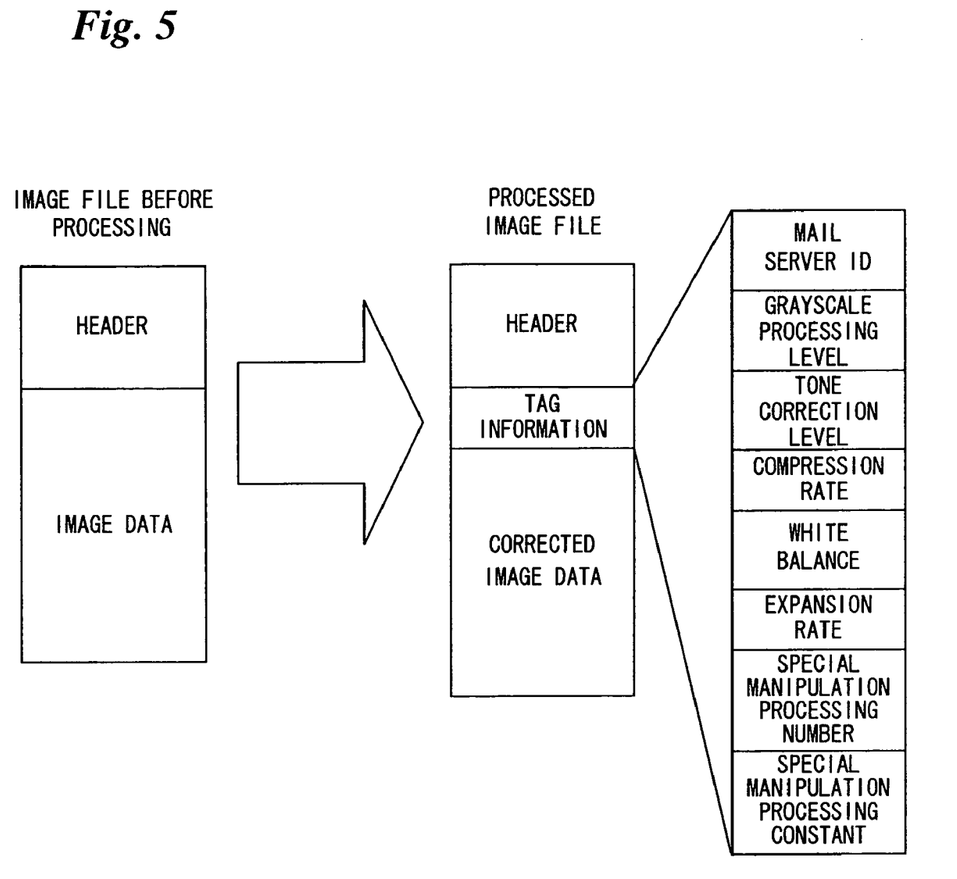
FIG. 5 illustrates another example of the data structure of an image file before processing and the data structure of the image file after processing.

FIG. 5 illustrates another example of an image file (an image file before processing) that has been attached to mail with an image transmitted from the sender terminal 20 and an image file (a processed image file) in which a tag has been inserted by the image processing unit 14 of the mail server 10.

For example, in a case where the image processing unit 14 is to apply correction processing such as a grayscale correction, tone correction, compression (or expansion) processing, white balance correction or special manipulation (e.g., processing for image rotation) to image data contained in an image file (image file before processing) that has been attached to mail with an image transmitted from the sender terminal 20, the image processing unit 14 subjects the image data to such processing and inserts information, which serves as a tag and indicates the kind of correction processing that was applied to the image data in the image file, in the header of the processed image file. The following are inserted into the tag in the header of the processed image file (see FIG. 5): grayscale processing level, tone correction level, compression rate (or expansion rate), whether white balance processing was executed, a number (special manipulation number) indicating the nature of special manipulation processing, a constant indicating the degree of special manipulation processing (e.g., angle of rotation in a case where the special manipulation processing is image rotation processing), and an ID for identifying the mail server that applied the above image processing to the image data.

The user of the receiver terminal 30 that has received an image file having an inserted tag indicative of the nature of an image correction is capable of ascertaining the kind of correction processing that was applied to the image data of the original image file (the image file before processing) to thereby result in the image data (corrected imaged data) of the received image file (the processed image file).

As many apparently widely different embodiments of the present invention can be made without departing from the spirit and scope thereof, it is to be understood that the invention is not limited to the specific embodiments thereof except as defined in the appended claims.

What is claimed is:

1. An e-mail server computing device, comprising:
   an e-mail receiving unit receiving e-mail, to which an image file has been attached, transmitted from an e-mail transmission-source device to the e-mail server computing device;
   a sender-information archiving database storing information relating to a sender who transmits e-mail using the transmission-source device;
   an image processing unit appending information relating to the sender that has been stored in said sender-information archiving database to the image file that has been attached to the e-mail received by said e-mail receiving unit;
   e-mail reconstructing means for attaching the image file, to which the information relating to the sender has been appended by said image processing unit, to the e-mail in place of the image file that was attached to the e-mail received by said e-mail receiving unit; and
   an e-mail transmitting unit transmitting the e-mail, which has been obtained by the e-mail reconstructing means and to which the image file having the appended information relating to the sender has been attached, from the e-mail server computing device to the e-mail transmission-source device.

2. The e-mail server computing device according to claim 1, wherein said image processing unit further appends information, which represents the number of times the image file attached to e-mail received by said e-mail receiving unit has passed through the e-mail server, to the image file.

3. The e-mail server computing device according to claim 1, wherein said image processing unit further appends a flag, which indicates that the image file that has been attached to e-mail received by said e-mail receiving unit has passed through the e-mail server, to the image file.

4. An e-mail server computing device, comprising:
   an e-mail receiving unit receiving e-mail, to which an image file has been attached, transmitted from an e-mail transmission-source device to the e-mail server computing device;
   an information archiving database storing one or a plurality of items of information in correspondence with a transmission-source e-mail address contained in e-mail transmitted from the transmission-source device;
   an image processing unit appending at least any one item of information to the image file that has been attached to the e-mail received by said e-mail receiving unit, the information being from among the information that has been stored in said information archiving database in correspondence with the transmission-source e-mail address contained in the e-mail received by said e-mail receiving unit;
   e-mail reconstructing means attaching the image file, to which the information has been appended by said image processing unit, to the e-mail in place of the image file that was attached to the e-mail received by said e-mail receiving unit; and
   an e-mail transmitting unit transmitting the e-mail, which has been obtained by said e-mail reconstructing means and to which the image file having the appended information has been attached, from the e-mail server computing device to the e-mail transmission-source device.

5. A computer-readable medium, storing instructions, executed by a processor, to perform a method for causing an e-mail server to relay e-mail transmitted from a transmission-source device and received at a transmission-destination device, the method comprising:
   receiving e-mail, to which an image file has been attached, transmitted from an e-mail transmission-source device;
   storing information relating to a sender who transmits e-mail using the transmission-source device; an image processing unit for appending information relating to the sender who has been stored in said sender-information archiving database to the image file that has been attached to the e-mail received by said e-mail receiving unit;
   attaching the image file, to which the information relating to the sender has been appended by said image processing unit, to the e-mail in place of the image file that was attached to the e-mail received by said e-mail receiving unit; and
   transmitting the e-mail, which has been obtained by the e-mail reconstructing means and to which the image file having the appended information relating to the sender has been attached, from the e-mail server computing device to the e-mail transmission-source device.

6. A computer-readable medium, storing instructions, executed by a processor, to perform a method for causing an e-mail server to relay e-mail transmitted from a transmission-source device and received at a transmission-destination device, the method comprising:
   receiving e-mail, to which an image file has been attached, transmitted from an e-mail transmission-source device;
   storing one or a plurality of items of information in correspondence with a transmission-source e-mail address contained in e-mail transmitted from the transmission-source device;
   appending at least any one item of information to the image file that has been attached to the e-mail received by said e-mail receiving unit, the information being from among the information that has been stored in said information archiving database in correspondence with the transmission-source e-mail address contained in the e-mail received by said e-mail receiving unit;
   attaching the image file, to which the information has been appended by said image processing unit, to the e-mail in place of the image file that was attached to the e-mail received by said e-mail receiving unit; and
   transmitting the e-mail, which has been obtained by said e-mail reconstructing means and to which the image file having the appended information has been attached, from the e-mail server computing device to the e-mail transmission-source device.

7. An e-mail server computing device, comprising:
   a memory, storing a set of instructions; and
   a processor, executing the stored set of instructions, to perform a method comprising:
   receiving e-mail, to which an image file has been attached, transmitted from an e-mail transmission-source device to the e-mail server computing device;
   storing information relating to a sender who transmits e-mail using the transmission-source device;
   appending information relating to the sender that has been stored in said sender-information archiving database to the image file that has been attached to the e-mail received by said e-mail receiving unit;
   attaching the image file, to which the information relating to the sender has been appended by said image processing unit, to the e-mail in place of the image file that was attached to the e-mail received by said e-mail receiving unit; and
   transmitting the e-mail, which has been obtained by the e-mail reconstructing means and to which the image file having the appended information relating to the sender has been attached, from the e-mail server computing device to the e-mail transmission-source device.

8. An e-mail server computing device, comprising:
   a memory, storing a set of instructions; and
   a processor, executing the stored set of instructions, to perform a method comprising:
   receiving e-mail, to which an image file has been attached, transmitted from an e-mail transmission-source device to the e-mail server computing device;
   storing one or a plurality of items of information in correspondence with a transmission-source e-mail address contained in e-mail transmitted from the transmission-source device;
   appending at least any one item of information to the image file that has been attached to the e-mail received by said e-mail receiving unit, the information being from among the information that has been stored in said information archiving database in correspondence with the transmission-source e-mail address contained in the e-mail received by said e-mail receiving unit;
   attaching the image file, to which the information has been appended by said image processing unit, to the e-mail in place of the image file that was attached to the e-mail received by said e-mail receiving unit; and
   transmitting the e-mail, which has been obtained by said e-mail reconstructing means and to which the image file having the appended information has been attached, from the e-mail server computing device to the e-mail transmission-source device.

* * * * *